(12) United States Patent
Cifuentes et al.

(10) Patent No.: US 6,409,799 B1
(45) Date of Patent: Jun. 25, 2002

(54) COPPER LEACH PROCESS AIDS

(75) Inventors: Ricardo Arancibia Cifuentes, Santiago (CL); Donald C. Roe, Jamison, PA (US); Jorge Vergara Chavez; Andres Reghezza Inzunza, both of Chuquicamata (CL)

(73) Assignee: Betzdearborn Inc. & Corporacion Nacional del Cobre de Chile, Trevose, PA (US); a part interest (*) Notice: Subject to any disclaimer, the term of this patent is extended or adjusted under 35 U.S.C. 154(b) by 0 days.

(21) Appl. No.: 09/443,593

(22) Filed: Nov. 19, 1999

Related U.S. Application Data
(60) Provisional application No. 60/109,128, filed on Nov. 19, 1998.

(51) Int. Cl.[7] .............................. B01D 11/00; B01F 1/00; C21B 15/00; C22B 15/00
(52) U.S. Cl. ........................................... 75/743; 423/41
(58) Field of Search .................. 423/41; 75/743

(56) References Cited

U.S. PATENT DOCUMENTS

| | | | | |
|---|---|---|---|---|
| 3,837,489 A | * | 9/1974 | Michalski et al. | 209/167 |
| 3,886,257 A | * | 5/1975 | Snell | 423/27 |
| 4,080,419 A | * | 3/1978 | Engelmann | 423/32 |
| 4,292,181 A | * | 9/1981 | Li et al. | 210/638 |
| 4,511,540 A | * | 4/1985 | Crussard et al. | 423/26 |
| 5,545,351 A | * | 8/1996 | Riggs et al. | 252/321 |
| 5,554,320 A | * | 9/1996 | Yianakopoulos | 252/389.23 |
| 5,952,281 A | * | 7/1998 | Mondin et al. | 510/365 |
| 5,908,605 A | * | 6/1999 | Virnig et al. | 423/24 |

OTHER PUBLICATIONS

DEARCODOX, Development of a Reagent That Improves the Production, Quality and Environment in Hydrometallurgical Systems;Pincheria, Reghezza, Vergara, Arcos, Cifuentes, and Vergara; Expomin '98, IV International Conference on Clean Technologies for the Mining Industry; May, 1998; Santiago, Chile.
Development of a Reagent Which Improves The Behavior of Hydrometallurgical Systems; Pincheira, Reghezza, Vergara, Heller, Arcos, Cifuentes, and Vergara; Randol International Conference & Exhibition, Vancouver '98.
DEARCODOX Product Folder and Fact Sheet, BetzDearborn Inc.; May 1997.

* cited by examiner

Primary Examiner—Wayne Langel
Assistant Examiner—Jonas N. Strickland
(74) Attorney, Agent, or Firm—Steven D. Boyd

(57) ABSTRACT

Methods for enhancing the leaching of copper from copper bearing ores with an aqueous sulfuric acid leach solution are disclosed wherein an antifoam formulation stable at a solution pH of about 1 to 2 is added. A preferred antifoam formulation comprises a glycol ester and an alkyl phenol ethoxylate in a paraffinic oil solvent added to the aqueous sulfuric acid leach solution.

15 Claims, 3 Drawing Sheets

COPPER LEACH PROCESS AIDS

This application claims benefit of Provision No. 60/109,128 filed Nov. 19, 1998.

FIELD OF THE INVENTION

The present invention provides methods for improving the unit operations employed in recovery of copper from copper ores in leaching operations.

BACKGROUND OF THE INVENTION

The use of sulfuric acid (pH about 1.5) to leach copper from copper bearing ores is well known. Such leach operations are useful in recovering copper for ores which include oxides of copper. The leach operation can be carried out in heaps, dumps, and vats or in situ. In such leach operations, the sulfuric acid is used to remove the copper from copper bearing ore which it contacts. The dilute copper bearing aqueous sulfuric acid solution is then subjected to a solvent extraction operation to extract and concentrate the copper. The solvent extracted copper is then stripped from the organic phase back into an aqueous phase. The chemical reaction involved in stripping is the reverse of the extraction process: $CuR_2 + H_2SO_4 \rightleftharpoons Cu\,SO_4 + 2HR$. The aqueous phase is thereafter subjected to an electrowinning operation to recover the copper.

In heap leaching operations copper bearing ore from a mine may be crushed to produce an aggregate that is coarse enough to be permeable in a heap but fine enough to expose the copper metal values in the ore to the leaching solutions. After crushing, the ore is formed into heaps on impervious leach pads. A leaching solution of sulfuric acid is evenly distributed over the top of the heaps by sprinklers, wobblers or other similar equipment. As the barren leach solution percolates through the heap, it dissolves the copper contained in the ore. The leach solution collected by the impervious leach pad at the bottom of the heap is recovered and this "pregnant solution" is subjected to copper recovery operations (solvent extraction and electrowinning). Typically an agglomeration aid is added to the crushed ore and the so treated ore is agglomerated as with a disk pelletizer or by the action of conveyor belts. The agglomeration aids minimize the adverse effects of fines (i.e., −100 mesh components) on the heap leach operation.

In vat leach operations, copper bearing ores from a mine are crushed and placed in a large vat. The vat is filled with sulfuric acid which dissolves the copper oxides contained in the ore. The vat is drained and the "pregnant solution" subject to a copper recovery operation (solvent extraction and electrowinning).

In dump leach operations, copper bearing ore mounds, typically created by "dynamiting" an ore deposit, are sprayed with a sulfuric acid leach solution. The leach solution dissolves the copper oxides. Upon recovery, the leach solution is subjected to copper recovery operations (solvent extraction and electrowinning).

In in situ leach operations, underground copper bearing substrates are flooded with sulfuric acid leach solution. The leach solution is recovered and subjected to copper recovery operations (solvent extraction and electrowinning).

SUMMARY OF THE INVENTION

The present inventors discovered that the addition of a composition comprising an antifoam formulation such as a polyethylene glycol monooleate and an alkyl phenol ethoxylate in an oil solvent, to the sulfuric acid lixivant in copper extraction operations significantly enhance such operations.

DESCRIPTION OF THE PREFERRED EMBODIMENTS

Figure 1A:
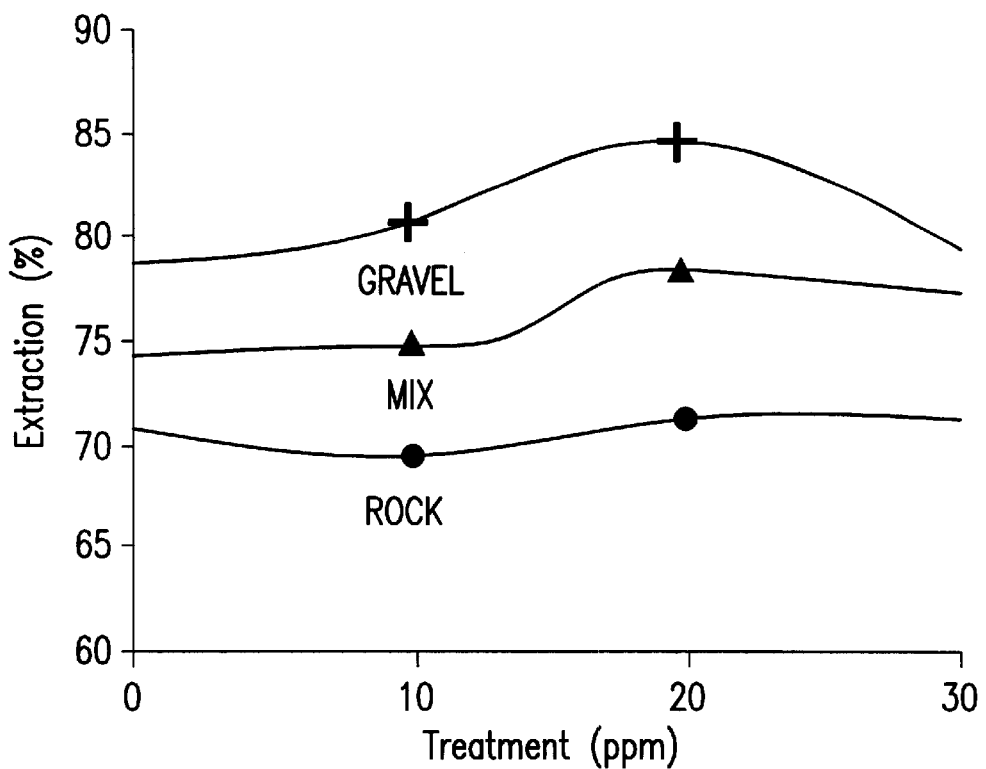
FIG. 1a is a plot of % extraction vs. treatment level (ppm).

The present invention relates to a method of enhancing the agglomeration of and recovery of copper from copper bearing ores. The method of the present invention involves adding a treatment formulation to the sulfuric acid lixivant used in agglomerating and/or leaching copper bearing ores in vats, heaps, dumps or in situ mining operations. The treatment of the present invention comprises an antifoam material which is stable or remains active in acid solutions (pH1–2).

Antifoam formulations in accordance with the present invention are those antifoam compositions stable in acid solutions (pH1–2) such as sulfuric acid or antifoam compositions which decompose in acidic solutions to provide decomposition products which exhibit antifoam properties.

Suitable antifoam chemistries may include, but are not limited to: fatty amides such as ethylene bis-stearamide; fatty esters or glycol esters such as polyethylene glycol ditallate; polyglycols such as ethoxylated/propoxylated alcohol; silicas such as fumed silica hydrophobed with silicone; silicones such as polydimethyl siloxane; wax dispersions such as paraffin wax emulsions; fatty acids such as stearic acid; fatty alcohols such as octadecanol; ethoxylated alkylphenols such as nonyl phenol ethoxylate; ethylene oxide/propylene oxide block copolymers or mixtures thereof.

The suitable antifoam formulation in accordance with the present invention can be formulated as: oil-based, that is the active antifoam dissolved in oil (paraffinic, naphthenic, aromatic, mineral or vegetable oil); water-based, that is the active anti-foam dissolved or emulsified in water; water-extended, that is oil-based antifoam emulsified in water (oil-in-water emulsions); concentrates, that is 100% active antifoam.

The preferred antifoam formulation treatment solution of the present invention comprises one or more low HLB (HLB less than about 10) surfactants in an oil-based solvent. The most preferred solution treatment comprises a glycol ester and an alkyl phenol ethoxylate in an oil solvent. Optionally, an alcohol can be employed in the composition.

The glycol esters are conventionally produced by polymerizing propylene oxide in the presence of an alkaline catalyst. Preferably, the glycol ester is polyethylene glycol monooleate having a molecular weight of about 400 to about 2000, or polyethylene glycol monotallate having a molecular weight of about 200 to about 2000. The preferred glycol esters are polyethylene glycol monooleate, but could be tallate, stearate, laurate and the like, most preferably with a molecular weight of about 400. A representative compound is commercially available from Lonza as PEG 400 MOT.

The alkylphenol ethoxylate compounds generally have the formula:

$C_nH_{2n+1}$—$C_6H_4$—O—$(CH_2$—$H_2O)_y$—H where y=1 to 12 and n=1 to 12

The glycol ester and alkyl phenol ethoxylate are added to the acidic solution in amounts to provide from about 5 to about 100 parts per million treatment formulation per ton of ore processed in a weight ratio of from about 5:95 to 95:5.

Of the compounds, nonylphenol ethoxylates are preferred with nonylphenol with about six moles ethoxylation most preferred. This compound is commercially available as Triton® N-60 from Rohm & Haas or Tergitol® NP-6 from Union Carbide.

The oil solvent can comprise a paraffinic oil solvent, an aromatic oil solvent or a naphthenic oil solvent. The paraffinic oil solvent is generally selected from those hydrotreated petroleum distillates having 10 to 18 carbon atoms such as mineral oil. Representative solvents are commercially available as Varsol® (believed to be an iso-paraffinic petroleum distillate) or Exxsol® D-40 (believed to be a light hydrogenated petroleum distillate) from EXXON Chemicals.

The treatment of the present invention can be added to leach solution used in agglomeration of crushed ore in heap leaching operation and/or to the leach solution sprayed on the heap. In vat, dump and in situ leach operations, the lixivant treatment can be added directly to the leach solution.

When the treatment is employed during agglomeration of crushed ore, it has been found to inhibit the atmospheric release of fugitive dust during agglomeration and transfer of agglomerate in the forming of heaps. When present in the leach solution during actual leach operations, the treatment of the present invention has been found to result in significant improvements in the leach operation. The treatment solution has been found to increase the recovery of copper values from the ore. The treatment has been found to enhance drainage of pregnant lixivant from the ore heap, ore dump, or vat. The treatment has been found to provide for a pregnant liquor which is "clearer", that is contains fewer "fines" or contaminants.

The addition of the treatment of the present invention to a sulfuric acid leach solution used in copper leach mining operations has been found to provide significant improvements in the overall leaching operation.

The present invention will not be further described with reference to a number of specific examples which are to be regarded as illustrative and not as restricting the scope of the present invention.

EXAMPLES

Example 1

Tests were conducted to determine the effect of the treatment of the present invention using different grain sizes of rock, gravel and of mix (60% gravel–40% rock) and ⅜ inch, 20, 100 and –100 Tyler mesh copper bearing ore. 50 kilograms of ore, of 0.7% moisture level was laced in a column and exposed to sulfuric acid lixivant at a rate of 0.36 liters per kilogram for 168 hours. The lixivant included 0, 30 or 60 parts per million of a treatment in accordance with the present invention comprising a polyethylene glycol monooleate of molecular weight of about 400 and a nonyl phenol with 6 moles of ethoxylate in a paraffin oil solvent. The percent of copper recovered from the ore was calculated.

Figure 1B:
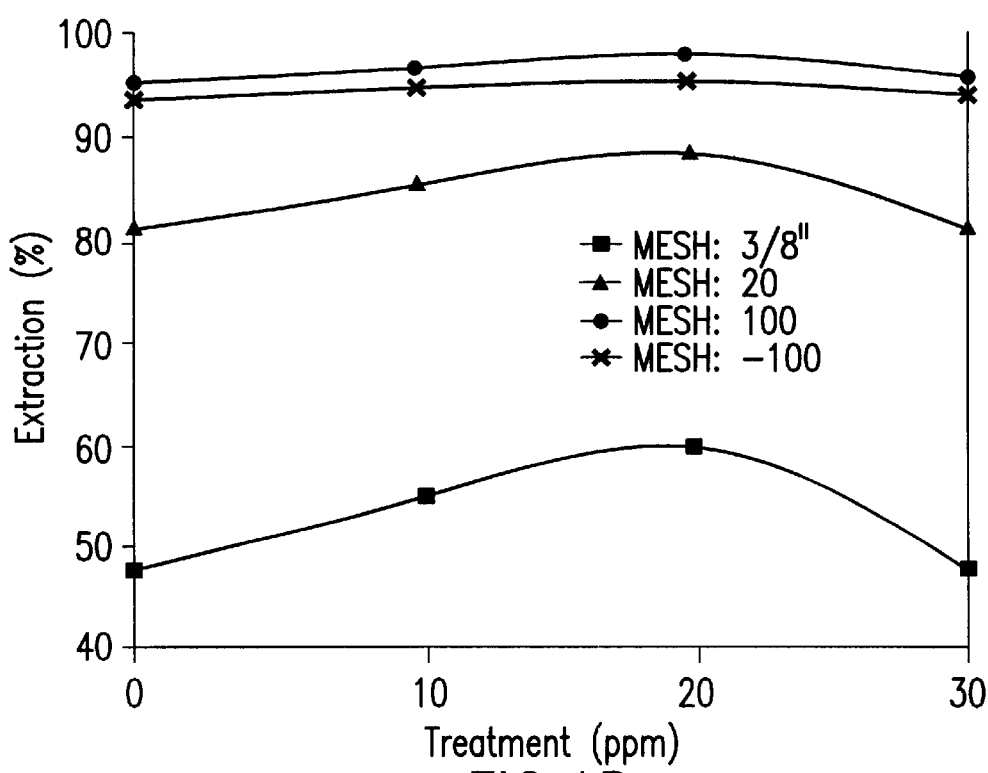
FIG. 1b is a plot of % extraction vs. treatment level (ppm).

FIGS. 1a and 1b summarize the results and show that addition of the treatment in accordance with the present invention enhanced the recovery of copper.

Figure 2:
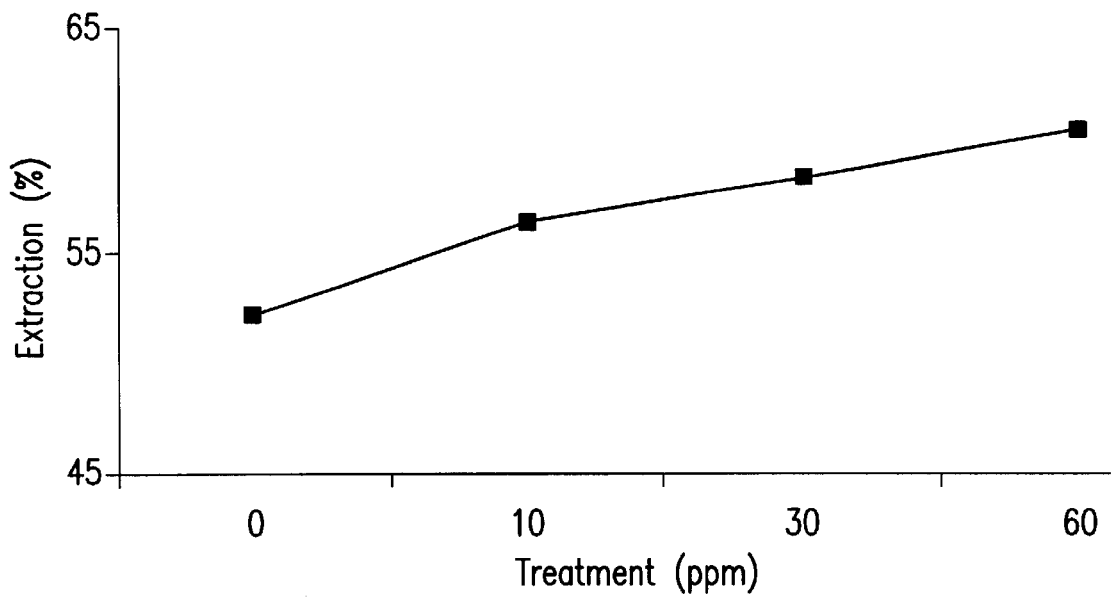
FIG. 2 is a plot of % extraction vs. treatment level (ppm).
Figure 3:
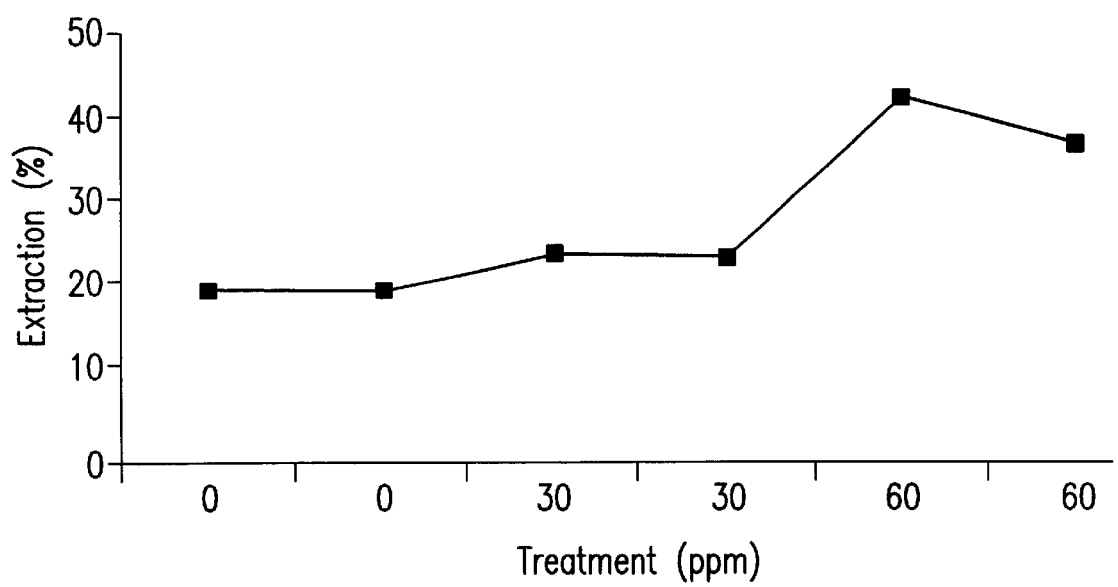
FIG. 3 is a plot of % extraction vs. treatment level (ppm).

Additional column leach testing on oxide waste rock was performed. The results are summarized in FIG. 2 and show a significant increase in the percent copper extracted as a treatment in accordance with the present invention was added.

The present invention will now be further described with reference to a number of specific examples which are to be regarded as illustrative and not as restricting the scope of the preset invention.

Example 2

Testing of the density of agglomerated copper bearing ore in which sulfuric acid lixivant with 10 grams per ton and without the treatment described in Example 1 added was undertaken. Table 1 summarizes the results and shows that addition of 10 grams per ton of treatment in accordance with the present invention to sulfuric acid lixivant used as an agglomerating agent reduces the density of the agglomerate in the heap by about 7%. This reduction in density results in improved drainage of the leach solution through the heap.

TABLE 1

| Test | Discharge from Agglomeration Drum | Density At Base of Heap With Treatment | At Base of Heap Without Treatment |
|---|---|---|---|
| 1 | 1.45 | 1.56 | 1.70 |
| 2 | 1.50 | 1.62 | 1.74 |
| 3 | 1.45 | 1.57 | 1.70 |
| 4 | 1.43 | 1.54 | 1.66 |
| 5 | 1.47 | 1.59 | 1.71 |
| 6 | 1.42 | 1.54 | 1.68 |
| 7 | 1.44 | 1.57 | 1.71 |
| 8 | 1.43 | 1.58 | 1.70 |
| 9 | 1.42 | 1.55 | 1.67 |
| 10 | 1.42 | 1.55 | 1.65 |

Example 3

Figure 4:
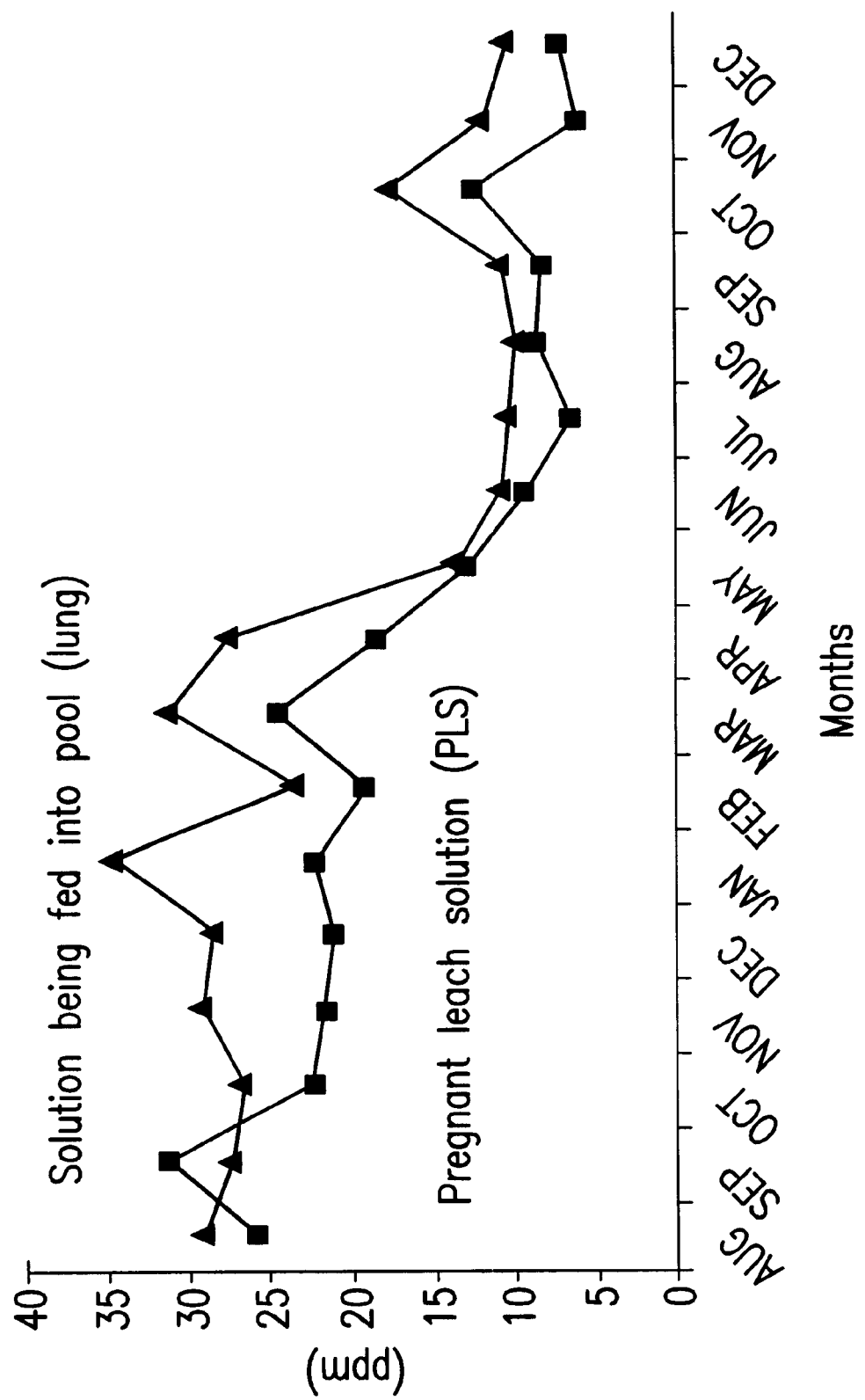
FIG. 4 is a plot of suspended solids (ppm) vs. time (months).

Testing of 10 grams per ton of the treatment described in Example 1 was undertaken in a commercial copper recovery operation. As the treatment was maintained, a significant decrease in the amount of fines in the pregnant leach solution and the solution being fed in the pools developed. FIG. 4 summarizes the results and show that after addition of the treatment began in December-January there was a drastic reduction in suspended solids in the pregnant leach solution and solution fed to the pools. This ensures a more stable solvent extraction process.

While the present invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. In a method of recovering copper from crushed copper bearing ore wherein an aqueous sulfuric acid leach solution is employed to leach copper from copper bearing ore wherein the improvement comprises adding an antifoam formulation which exhibits antifoam properties at a solution pH of about pH 1 to 2 selected from the group consisting of fatty amides, glycol esters, fatty esters, polyglycols, silicas, silicons, wax dispersions, fatty acids, fatty alcohols, ethoxylated alkyl phenols, ethylene oxide/propylene oxide block copolymers, and mixtures thereof in an amount of from about 5 to about 100 parts per million to said aqueous sulfuric acid leach solution.

2. The method of claim 1 wherein said antifoam formulation is dissolved in an oil selected from the class consisting of paraffinic oil, naphthenic oil, aromatic oil, mineral oil, vegetable oil and mixtures thereof.

3. The method of claim 2 wherein said antifoam comprises an oil-in-water emulsion.

4. The method of claim 1 wherein said antifoam formulation is dissolved in water.

5. A method of recovering copper from copper bearing ore comprising the steps of:
   a) exposing crushed copper bearing ore to an aqueous sulfuric acid leach solution to form a copper rich, pregnant leach solution;
   b) recovering said copper rich, pregnant leach solution; and
   c) recovering copper from said copper rich, pregnant leach solution wherein said aqueous sulfuric acid leach solution includes a glycol ester and an alkyl phenol ethoxylate in an oil solvent which is an antifoam at solution pH's of from 1 to 2, and is added to said sulfuric acid leach solution in a concentration of from about 5 to about 100 parts per million per ton of ore processed in a weight ratio of from about 5:95 to 95:5.

6. The method of claim 5 further comprising adding an alcohol to said acid solution.

7. The method of claim 5 wherein said alkyl phenol ethoxylate has the general formula $C_nH_{2n+1}$—$C_6H_4$—O—$(CH_2$—$H_2O)_y$—H where y=1 to 12 and n=1 to 12.

8. The method of claim 7 wherein said alkyl phenol ethoxylate is nonyl phenol ethoxylate.

9. The method of claim 8 wherein said nonyl phenol ethoxylate has about six moles of ethoxylation.

10. The method of claim 5 wherein said glycol ester is selected from the group consisting of polyethylene glycol monooleate and polypropylene glycol monooleate.

11. The method of claim 10 wherein said polypropylene glycol monoleate has a molecular weight of from about 400 to about 2000.

12. The method of claim 10 wherein said polyethylene glycol monoleate has a molecular weight of from about 200 to 2000.

13. The method of claim 5 wherein said oil solvent is a paraffinic oil solvent.

14. The method of claim 5 wherein said oil solvent is a naphthenic oil solvent.

15. The method of claim 5 wherein said oil solvent is an aromatic oil solvent.

* * * * *